United States Patent [19]

Prentice

[11] Patent Number: 4,481,816
[45] Date of Patent: Nov. 13, 1984

[54] PIPELINE GAUGING VEHICLES

[75] Inventor: Ian Prentice, Bedlington, England

[73] Assignee: British Gas Corporation, London, England

[21] Appl. No.: 466,158

[22] Filed: Feb. 14, 1983

[30] Foreign Application Priority Data

Mar. 24, 1982 [GB] United Kingdom ................ 8208579

[51] Int. Cl.³ .............................................. G01B 5/12
[52] U.S. Cl. ................... 73/432 R; 33/178 F
[58] Field of Search ............ 73/432 R, 432 G, 432 B; 33/178 F

[56] References Cited

U.S. PATENT DOCUMENTS

| 3,786,684 | 12/1974 | Wiers et al. | 73/432 B |
| 3,940,855 | 3/1976 | Nooy et al. | 33/178 |
| 4,227,309 | 10/1980 | Jones | 33/178 F |

Primary Examiner—S. Clement Swisher
Attorney, Agent, or Firm—Watson, Cole, Grindle & Watson

[57] ABSTRACT

A pipeline gauging vehicle has two resilient driving cups arranged to contact the interior surface of the pipeline to create a pressure differential which will propel the vehicle along the pipeline. A plurality of first monitoring arrangements, each consisting of six detecting elements located at circumferentially spaced positions, are axially spaced on a support structure, their orientation being commensurate with a minimum radius of curvature of bends in the pipeline which the vehicle needs to negotiate. A plurality of second monitoring arrangements axially spaced on the support structure have detecting tabs radially spaced from the longitudinal axis of the vehicle by a distance commensurate with a desired minimum radial clearance are arranged to provide an indication when the minimum clearance is exceeded. The vehicle can monitor pipelines having complex three-dimensional geometry involving a succession of bends in different directions.

12 Claims, 3 Drawing Figures

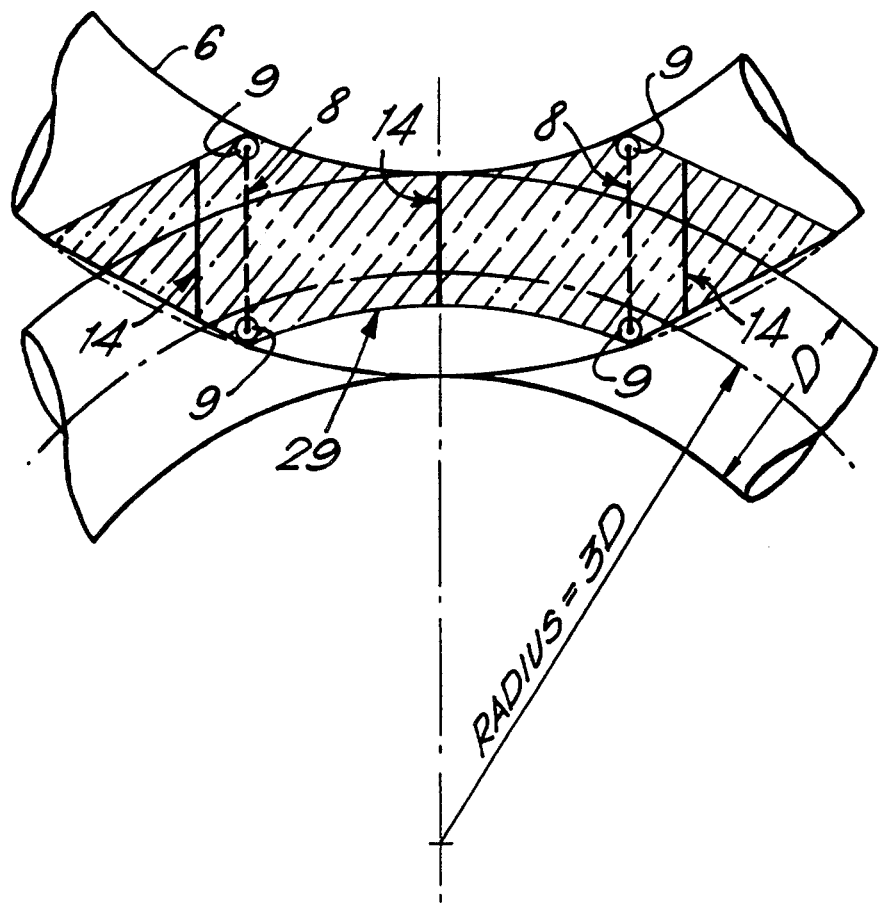

PIPELINE GAUGING VEHICLES

This invention relates to pipeline gauging vehicles of a kind which are propelled along the pipeline by pressure produced by fluid flowing along the pipeline, and which are intended for the detection of features or obstructions in the pipeline.

It is a practice well known in the operation of gas or liquid transmission pipelines to send a simple gauging vehicle down the pipeline to check that the minimum pipeline bore is not less than that specified. Such a gauging vehicle usually consists of a body part, fitted with cup rubber seals to allow the vehicle to be propelled along the pipeline by the fluid flow therein, and a gauge plate or disk of a ductile deformable metal (frequently aluminium). The diameter of the disk is chosen to be slightly less than the minimum specified pipeline bore. Passage of the gauging vehicle through the pipeline and its retrieval with the gauging plate free from deformation or scoring is taken as adequate proof of the pipeline bore. It has also been proposed that the disc should have a plurality of strain gauges secured to a peripheral region so as to provide an output signal when the disc is deformed rapidly. Such pipeline gauging vehicles are not suitable for acting as a precursor since they are capable of doing nothing more than monitor the pipeline for gross obstructions or reductions in diameter.

However, it is increasingly the practice to perform additional inspections of a pipeline's structural integrity by the use of sophisticated magnetic on ultrasonic pipeline inspection vehicles designed to detect flaws or surface irregularities, e.g., corrosion, gouging, cracks etc. in the pipeline wall.

These inspection vehicles are provided with resilient driving cups which contact the interior wall of the pipeline so that the fluid flow therein provides a driving force which propels the vehicle along the pipeline. Such inspection vehicles have not only parts which need to touch or be in close proximity with the interior surface of the pipeline but also parts which must be spaced from the interior surface of the pipeline. Examples of parts of the former kind are magnetic brush pole pieces and ultrasonic sensing heads, while examples of parts of the latter kind are the mounting rings for the pole pieces or sensing heads and the mounting members for the resilient driving cups.

To accommodate the necessary inspection systems and electronic data recording equipment, such inspection vehicles occupy a considerable proportion and length of the pipeline bore and may comprise two or more modules, linked together into a train by suitable flexible couplings.

The inspection vehicles are run at intervals in fully commissioned pipelines and it is imperative that their use does not interfere with the gas or liquid flow in the pipeline or that the inspection vehicle is not damaged during an enforced stoppage or its subsequent extrication from the pipeline. The possibility of an inspection vehicle jamming in a pipeline must therefore be minimised by all possible means.

Pipelines contain sections consisting of complex series of bends where the pipeline negotiates rivers, canals, railways or other natural or man-made barriers. The horizontal direction and vertical inclination of the pipeline may change simultaneously at a bend giving rise to a rather complex three-dimensional internal pipeline geometry. Moreover, changes in the dimensions of the bore may occur due to, for example, increases in pipeline wall thickness needed to provide reinforcement at road crossings. The interior of the pipeline may also contain other obstructions. In addition to insitu constructed bends of relatiely large radius of curvature, factory made 'forged' bends of known radius of curvature are used in the construction of pipelines. The centre line radius of curvature of such forged bends is normally standardised for a given pipeline and it is good practice not to use radii smaller than three pipe diameters in pipelines that it is intended to inspect. It is not unknown, however, for bends of a smaller radius of curvature than that specified to be installed on a pipeline. The effective bend radius can also be reduced by removing material from the end face of the bend so that the pipe edge is not normal to the centre line tangent plane, producing a discontinuous curve.

To guarantee at the design stage the passage of a pipeline inspecting vehicle, itself of complex geometry, through pipeline bend sequences of three-dimensional complexity is not therefore generally possible, and the passage of a known simple gauging vehicle as previously described, which only proves the pipeline bore, does not provide adequate assurance that the aforesaid sophisticated pipeline inspection vehicles will safely traverse the pipeline.

An object of this invention is to provide a pipeline gauging vehicle which can act as a precursor vehicle in the circumstances discussed above to ascertain whether or not an inspection vehicle comprising one or more sections, as the case may be, could negotiate the three-dimensional geometry including any bends or obstructions in the pipeline.

To this end, according to the invention, a pipeline gauging vehicle comprises at least one resilient driving cup mounted around an axially extending support structure of the vehicle so as to contact the interior wall of the pipeline and thus provide a pressure differential across the driving cup which will propel the vehicle along the pipeline, at least two first monitoring arrangements located at axially spaced positions on the support structure, each first monitoring arrangment consisting of at least three detecting elements located at circumferentially spaced positions around the support structure and at a predetermined radial distance from the longitudinal axis of the vehicle, the axial spacing of the first monitoring arrangements and the radial location of their individual detecting elements being commensurate with a minimum radius of curvature of bends in the pipeline which the vehicle needs to negotiate when travelling through a pipeline, and a plurality of second monitoring arrangements mounted at axially spaced positions on the support structure and having detecting portions radially spaced from the longitudinal axis of the vehicle by a distance commensurate with a predetermined minimum radial distance from the interior surface of the pipeline which must be clear when the vehicle is travelling through the pipeline so as to engage the interior surface of the pipeline and provide an indication when said minimum radial distance is exceeded.

Preferably the axial spacing of the first monitoring arrangements and the radial location of their individual detecting elements are commensurate with a three dimensional geometry of the pipeline involving two successive bends in different directions.

In order to ensure that the gauging vehicle should not become jammed in a pipeline, one or more detecting elements of a first monitoring arrangement are arranged to move inwards to a deflected position when a bend in the pipeline is less than said minimum radius of curvature. A detecting element of a first monitoring arrangement may be prevented from moving to the deflected position by a member which shears when pressure on the detecting element exceeds a predetermined value or by a spring loaded mechanism which collapses when pressure on the detecting element exceeds a predetermined value.

Preferably at least four first monitoring arrangements are spaced along the longitudinal axis of the vehicle and each first monitoring arrangement comprises six detecting elements located at equally spaced positions around the support structure. The first monitoring arrangements may comprise wheel assemblies and each detecting element may be a wheel. These first monitoring arrangements may represent features of an inspection vehicle which normally would contact the interior wall of the pipeline.

A second monitoring arrangement may comprise a substantially circular array of detecting portions which deform upon contact with the interior surface of the pipeline and remain deformed to provide an indication that the minimum radial distance has been exceeded. These second monitoring arrangements may represent features of an inspection vehicle which normally would not contact the interior wall of the pipeline.

The circular array of detecting portions may be provided by a multiplicity of separate radially extending members of a deformable material, or by a circular disc or deformable material provided with a multiplicity of radially extending slots, the tips of the portions of the disc between the slots providing the detecting portions.

The support structure may comprise a single longitudinally extending arrangement or may comprise at least two sections coupled in tandem, each section having at least one first monitoring arrangement and at least one second monitoring arrangement.

An embodiment of the invention will now be described, by way of example, with reference to the accompanying drawings, in which:

FIG. 3 is a schematic diagram showing the location of first and second monitoring arrangements suitable for monitoring a pipeline having bends of a radius up to three times the diameter of the pipeline.

Figure 1:
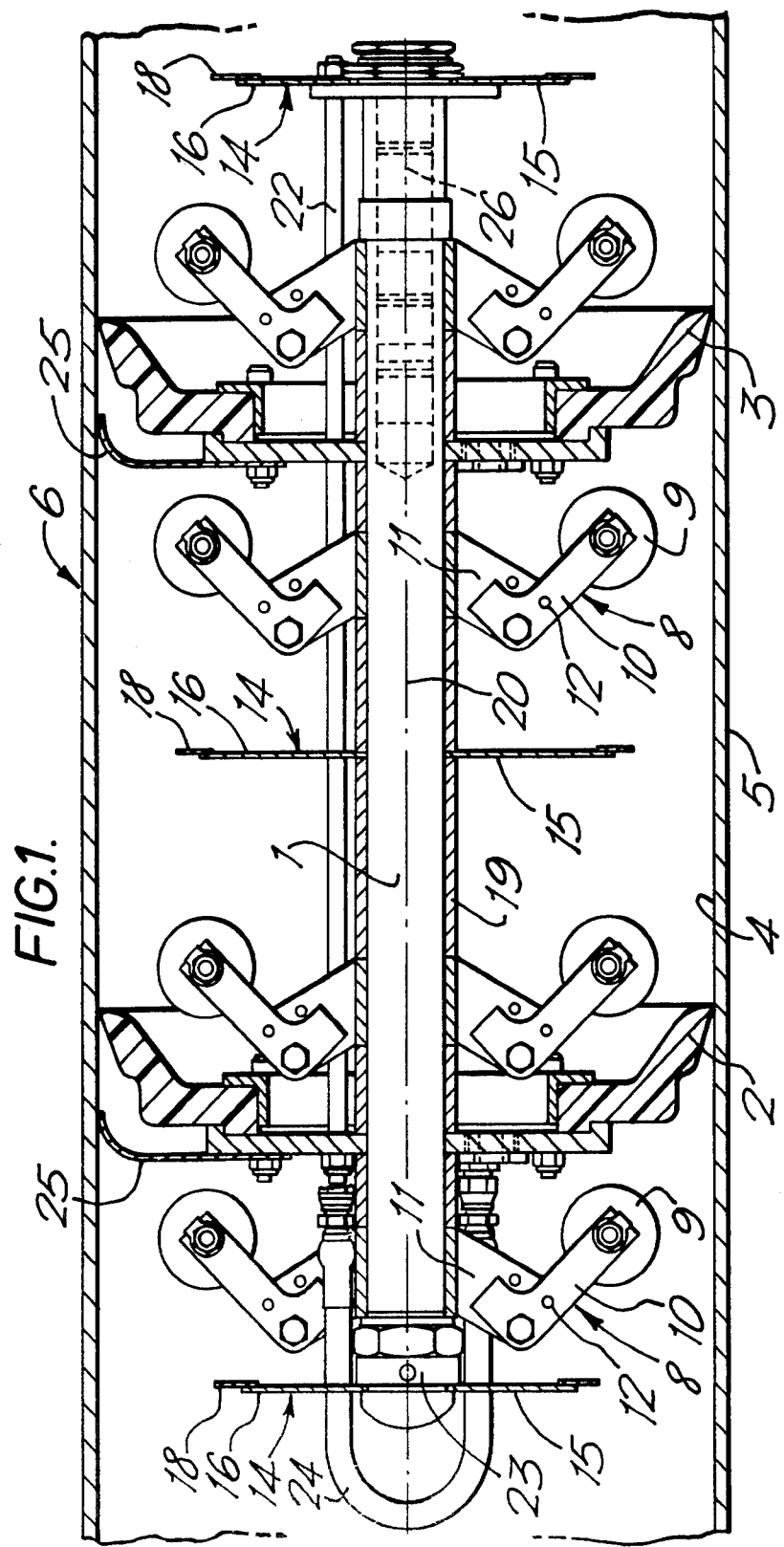
FIG. 1 is a sectional side elevation of a pipeline gauging vehicle in accordance with the invention located within a pipeline.
Figure 2:
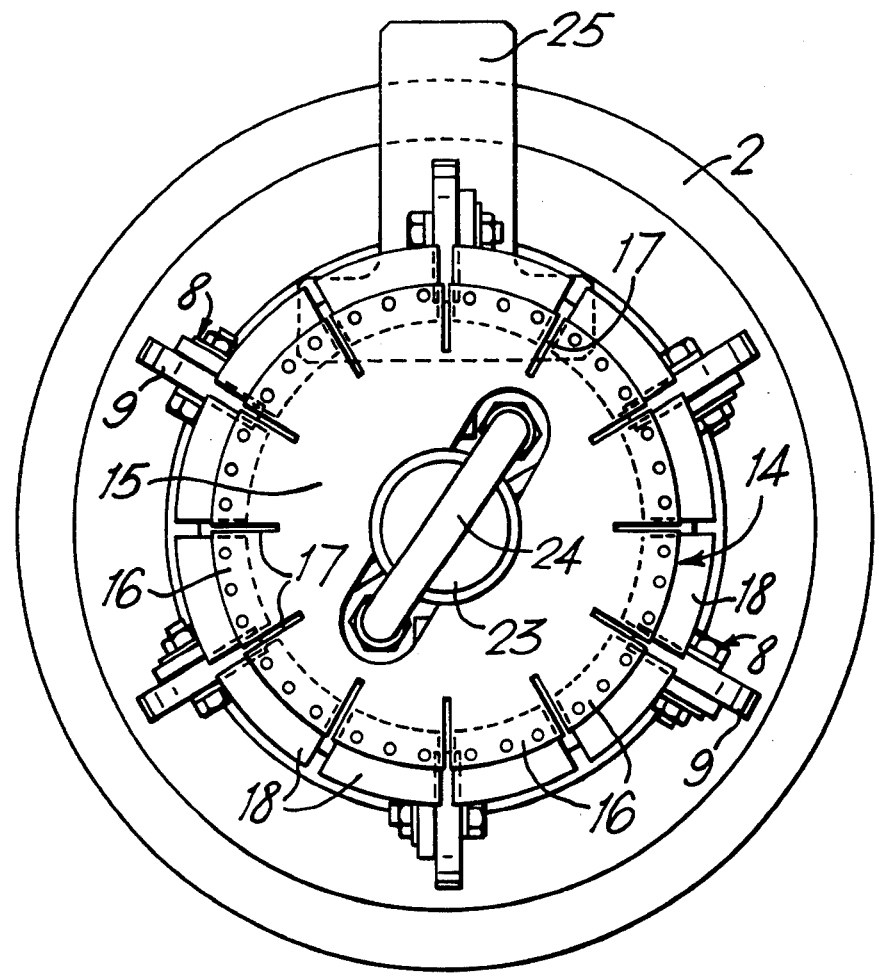
FIG. 2 is a front view of the pipeline gauging vehicle shown in FIG. 1.

Referring in the first instance to FIGS. 1 and 2 the pipeline gauging vehicle comprises a central support structure 1 provided with a front flexible polyurethane driving cup 2 and a rear flexible polyurethane driving cup 3. The flexible driving cups 2 and 3, which are attached to the tubular support structure 1, are arranged to press against the interior surface 4 of the cylindrical wall 5 of the pipeline 6 along which a fluid such as a gas under pressure is being conveyed and thus support the vehicle and provide a pressure differential across the cups 2 and 3 which will act to propel the vehicle along the pipeline 6.

The vehicle is provided with four first monitoring arrangements in the form of four wheel assemblies 8 located at axially spaced positions along the support structure 1 each wheel assembly consisting of six detecting elements in the form of six wheels 9 located at circumferentially spaced positions around the support structure 1. Each wheel 9 is carried on the free end of a cranked arm 10 which is pivotally mounted on a spider 11 secured to the support structure 1 but is retained in the position shown in the drawing by a shear pin 12 which will fail and allow the wheel 9 to move radially inwards if the wheel encounters an excessive load.

Also mounted on the support structure 1 at axially spaced positions are three second monitoring arrangements 14 in the form of three circular steel plates 15. The outer periphery of each steel plate 15 is divided into a multiplicity of separate fingers 16 by a multiplicity of radially extending slots 17, the tip of each finger 16 being provided with a detecting portion in the form of a detecting tab 18 of an easily deformable metal such as copper which is riveted to the tip of the finger 16. The wheel assemblies 8 and the second monitoring arrangements 14 are axially positioned by spacing members 19 and are prevented from rotating about the longitudinal axis 20 of the vehicle by a tie bar 22 which extends through the wheel assemblies, the second monitoring arrangements 14 and the flexible driving cups 2 and 3.

The wheel assemblies 8, the second monitoring arrangements 14 and the flexible driving cups 2 and 3 are locked together by a lock nut 23 at the front of the vehicle.

The front end of the vehicle is also provided with a loop 24 of soft flexible material to assist the removal of the vehicle from the pipeline 6 and with an earthing tab 25 which engages the interior surface 4 of the pipeline. The vehicle is also provided with a location signal generator 26 which is accommodated in the rear of the support structure 1.

The pipeline gauging vehicle in accordance with the invention as described above may be run through a pipeline 6 as a precursor vehicle to ensure that an inspection vehicle containing sophisticated electronic equipment is capable of negotiating the bends and obstructions in the pipeline. In this regard the axial spacing of the wheel assemblies 8 and the radial location of their individual wheels 9 are arranged to be commensurate with a minimum radius of curvature of the bends in the pipeline which the vehicle needs to negotiate during its travel through the pipeline.

Moreover, the detecting tabs 18 provided on the tips of the fingers 16 of the second monitoring arrangements 14 are arranged to be radially spaced from the longitudinal axis 20 of the vehicle by a distance commensurate with a predetermined minimum radial distance from the interior surface 4 of the pipeline which must be clear when the vehicle is travelling through the pipeline in order that fixed parts of the vehicle, such as the mounting rings 28 for the driving cups 3, do not engage the interior surface 4 of the pipeline when the pipeline is being negotiated by the vehicle. Thus, if the vehicle meets with an obstruction having a radial height which exceeds the predetermined minimum radial distance, the relevant detecting tab or tabs 18 will be deformed and will remain in the deformed position to provide an indication of the presence of the obstruction.

Should a bend in the pipeline 6 have a radius of curvature which is less than the minimum radius of curvature then one or more of the shear pins 12 will shear permitting the vehicle to negotiate the bends and providing an indication of the presence of such a bend. Should the vehicle fail to negotiate a bend even with all the shear pins 12 sheared then the location signal generator 26 provides a signal to enable the position of the vehicle to be determined.

Referring also to FIG. 3, the schematic diagram shows the optimum axial spacing of two wheel assemblies 8 and the optimum radial location of their individual wheels 9 which will permit corresponding movable parts on the vehicle such as magnetic brush pole pieces or ultrasonic sensing heads to negotiate bends in the pipeline 6 having a centre line radius of curvature of three or more times the diameter D of the pipeline 6. The wheel assemblies 8 and their individual wheels 9 could, of course, be located at other positions in the shaded area 29 which represents the limits of the space within the pipeline which is available for their placement in order to check whether or not other such movable parts on the vehicle could negotiate the bends.

Similarly, the schematic diagram shows the optimum radial length of the detecting tabs of the monitoring arrangements 14 which will permit corresponding fixed parts on the vehicle to negotiate bends in the pipeline having a centre line radius of curvature of three or more times the diameter D of the pipeline without engaging the interior surface of the pipeline. The monitoring arrangements 14 could of course be located at other positions in the shaded area 29 which is available for their placement in order to check whether or not other fixed parts on the vehicle could negotiate the bends without engaging the interior surface of the pipeline. The pipeline gauging vehicle in accordance with the invention will monitor not only simple bends as referred to above but also complex bends having a three dimensional geometry involving two, or more successive bands in different directions.

While the preferred second monitoring arrangements 14 described above comprises a circular disc divided into separate fingers 16 each provided with a deformable detecting tab 18, in other embodiments of the invention the second monitoring arrangement 14 may comprise a multiplicity of separate elements of a ductile material such as copper or aluminium or having tips of such a ductile material. In another embodiment of the invention the second monitoring arrangements 14 may comprise an unslotted disc of deformable material.

It is not essential that shear pins 12 should be provided to provide an indication of the presence of a bend having a radius of curvature which is less than the minimum, and such indication could equally well be provided by a spring-loaded mechanism which collapses when pressure on a wheel 9 exceeds a predetermined value. Moreover, while in the embodiment of the invention described above each wheel assembly 8 has six wheels 9 it will be appreciated that three or more equally spaced wheels 9 could be provided on each wheel assembly 8.

Finally, it will be appreciated that although the support structure described above comprises a single longitudinally extending arrangement, in other embodiments of the invention the support structure may comprise at least two sections coupled in tandem, each section having at least one first monitoring arrangement and at least one second monitoring arrangement. In this regard the gauging vehicle of the invention may be designed to perform a first task of checking that the pipeline is free of bends having a radius of curvature which is less than a desired minimum and may also be designed to perform a second task of checking that the three dimensional geometry of the pipeline is such as to permit the passage of an inspection vehicle of known configuration. The first task would be carried out initially and if completed successfully the second task would then be carried out.

Typically a gauging vehicle for carrying out the first task would comprise a single module having respective pluralities of first and second monitoring arrangements such as to check for the desired minimum radius of curvature. Typically, a gauging vehicle for carrying out the second task would comprise one or more modules each having respective pluralities of first and second monitoring arrangements simulating the configuration of the inspection vehicle and would be passed through the pipeline immediately prior to the inspection vehicle.

I claim:

1. A pipeline gauging vehicle comprising:
   (a) an axially extending support structure;
   (b) at least one resilient driving cup mounted around the support structure so as to contact the interior wall of the pipeline and thus provide a pressure differential across the driving cup which will propel the vehicle along the pipeline;
   (c) at least two first monitoring arrangements located at axially spaced positions on the support structure;
   (d) each first monitoring arrangement consisting of at least three detecting elements located at circumferentially spaced positions around the support structure and at a predetermined radial distance from the longitudinal axis of the vehicle;
   (e) the axial spacing of the first monitoring arrangements and the radial location of their individual detecting elements being commensurate with a minimum radius of curvature of bends in the pipeline which the vehicle needs to negotiate when travelling through the pipeline; and
   (f) a plurality of second monitoring arrangements mounted at axially spaced positions along the support structure;
   (g) each second monitoring arrangement having detecting portions radially spaced from the longitudinal axis of the vehicle by a distance commensurate with a predetermined minimum radial distance from the interior surface of the pipeline which must be clear when the vehicle is travelling through the pipeline;
   (h) whereby the detecting portions engage the interior surface of the pipeline and provide an indication when said minimum radial distance is exceeded.

2. A pipeline gauging vehicle as claimed in claim 1, wherein one or more detecting elements of a first monitoring arrangement are arranged to move inwards to a deflected position when a bend in the pipeline exceeds said minimum radius of curvature thereby to enable the vehicle to traverse a bend which is less than said minimum radius of curvature.

3. A pipeline gauging vehicle as claimed in claim 2, wherein a detecting element of a first monitoring arrangement is prevented from moving to the deflected position by a member which shears when pressure on the detecting element exceeds a predetermined value.

4. A pipeline gauging vehicle as claimed in claim 1, wherein a first monitoring arrangement comprises six detecting elements located at equally spaced positions around the support structure.

5. A pipeline gauging vehicle as claimed in claim 1, comprising four first monitoring arrangements spaced along the longitudinal axis of the vehicle.

6. A pipeline gauging vehicle as claimed in claim 1, wherein a first monitoring arrangement comprises a wheel assembly and each detecting element is a wheel.

7. A pipeline gauging vehicle as claimed in claim 1, wherein a second monitoring arrangement comprises a substantially circular array of detecting portions which deform upon contact with the interior surface of the pipeline and remain deformed to provide an indication that the minimum radial distance has been exceeded.

8. A pipeline gauging vehicle as claimed in claim 1, wherein a second monitoring arrangement comprises a circular disc of deformable material the periphery of which provides a multiplicity of detecting portions.

9. A pipeline gauging vehicle as claimed in claim 1, wherein a second monitoring arrangement comprises a circular disc of deformable material provided with a multiplicity of radially extending slots, the tips of the portions of the disc between the slots providing the detecting portions.

10. A pipeline gauging vehicle as claimed in claim 1, wherein a second monitoring arrangement comprises a multiplicity of separate radially extending members of a material which deforms upon contact with the interior surface of the pipeline.

11. A pipeline gauging vehicle as claimed in claim 1, wherein the support structure comprises a single longitudinally extending arrangement.

12. A pipeline gauging vehicle as claimed in claim 1, having two resilient driving cups, one resilient driving cup being mounted adjacent each end of the support structure.

* * * * *